(12) United States Patent　　(10) Patent No.:　　US 7,808,473 B2
Kamimura　　(45) Date of Patent:　　*Oct. 5, 2010

(54) DISPLAY APPARATUS AND METHOD OF CONTROLLING THE BACKLIGHT PROVIDED IN THE DISPLAY APPARATUS

(75) Inventor: Shigeki Kamimura, Tsurugashima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1168 days.

This patent is subject to a terminal disclaimer.

(21) Appl. No.: 11/440,011

(22) Filed: May 25, 2006

(65) Prior Publication Data

US 2007/0024582 A1　　Feb. 1, 2007

(30) Foreign Application Priority Data

Jul. 27, 2005　　(JP)　　............................... 2005-217774

(51) Int. Cl.
G09G 3/30　　(2006.01)
(52) U.S. Cl. .................................................... 345/102
(58) Field of Classification Search ............ 345/87–104
See application file for complete search history.

(56) References Cited

U.S. PATENT DOCUMENTS

| 7,580,024 | B2 * | 8/2009 | Kamimura | .................. | 345/102 |
| 2004/0246242 | A1 * | 12/2004 | Sasaki | ........................ | 345/204 |
| 2004/0257318 | A1 * | 12/2004 | Itoh | ........................... | 345/87 |
| 2005/0104839 | A1 * | 5/2005 | Baik | .......................... | 345/102 |
| 2005/0104840 | A1 * | 5/2005 | Sohn et al. | .................. | 345/102 |
| 2005/0163372 | A1 * | 7/2005 | Kida et al. | .................. | 382/169 |
| 2006/0077490 | A1 * | 4/2006 | Sheraizin et al. | ........... | 358/519 |

FOREIGN PATENT DOCUMENTS

| JP | 5-236400 | 9/1993 |
| JP | 3107444 | 9/2000 |
| JP | 2002-108305 | 4/2002 |
| JP | 2004-110050 | 4/2004 |
| JP | 2005-148709 | 6/2005 |

* cited by examiner

*Primary Examiner*—Alexander Eisen
*Assistant Examiner*—Nelson Lam
(74) *Attorney, Agent, or Firm*—Finnegan, Henderson, Farabow, Garrett & Dunner, L.L.P.

(57) ABSTRACT

According to one embodiment, a display apparatus having a display, a signal-processing unit, a luminance-curve converter, a histogram-extracting unit, a characteristic-control-data output unit, an integrator, and a multiplier. The signal-processing unit processes a video signal. The converter converts the input/output characteristic of the luminance level of the video signal. The histogram-extracting unit generates histogram distribution data for a luminance level of a video signal. The characteristic-control-data output unit sets a characteristic to the luminance-curve converter so that the converter emphasizes a low-luminance region of the image represented by the input video signal. The integrator integrates data items pertaining to the region emphasized by the converter, thereby generating an integrated value. From the output of the integrator, the multiplier generates an output that lowers the light-adjusting voltage applied to the display device.

10 Claims, 7 Drawing Sheets

DISPLAY APPARATUS AND METHOD OF CONTROLLING THE BACKLIGHT PROVIDED IN THE DISPLAY APPARATUS

CROSS-REFERENCE TO RELATED APPLICATIONS

This application is based upon and claims the benefit of priority from Japanese Patent Application No. 2005-217774, filed Jul. 27, 2005, the entire contents of which are incorporated herein by reference.

BACKGROUND

1. Field

One embodiment of the invention relates to a display apparatus and a device and method for controlling the backlight provided in the display apparatus. More particularly, one embodiment of the invention relates to a display apparatus that can impart enhanced gradation to dark images at low power consumption.

2. Description of the Related Art

As is known, digital television broadcasting has been promoted in recent years. In Japan, for example, not only satellite digital broadcasting systems, such as broadcasting-satellite (BS) digital broadcasting and 110-communications satellite (CS) digital broadcasting, but also the ground digital broadcasting has come into service.

TV broadcast receivers of a new type have come into use. They incorporate a record/playback device that automatically records any broadcast program that accords with the genre and keyword the user has input. When the user selects any broadcast program thus recorded, the record/playback device plays back the broadcast program.

The record/playback device needs to comprise a storage capacity large enough to record a number of broadcast programs. It also needs to access and retrieve any recorded program selected, as fast as possible. In view of this, a hard disk drive (HDD) is used as record/playback device.

The digital television broadcast receivers recently provided have a large display device and can be connected to various peripheral devices. In addition, they are connected, in increasing numbers, to networks. To improve the quality of images the display device may display, techniques have been developed, which adjust not only video signals, but also the amount of light the backlight emits.

To adjust the amount of light, the power-supply voltage of the backlight may be changed. When the power-supply voltage is changed, the image displayed may be degraded. Particularly in a large liquid crystal display, changes in the power-supply voltage of the backlight greatly influence the image gradation. It is therefore required that the power-supply voltage should be carefully controlled.

Jpn. Pat. Appln. KOAKI Publications 2004-110050 and 2005-148709 disclose the technique of controlling the voltage of a backlight in accordance with the characteristics of the video signals supplied to the display device that incorporates the backlight.

The technique disclosed in Jpn. Pat. Appln. KOAKI Publication 2004-110050 lies in using is to use the average picture level (APL) and the measured histogram distribution. First, a luminance-level region, e.g., a dark region, is designated and measured. Then, it is determined whether the histogram distribution measured exceeds the threshold value for the luminance-level region designated. If the histogram distribution does, the region is regarded as a dark region, regardless of the APL determined.

The technique disclosed in Jpn. Pat. Appln. KOAKI Publication 2005-148709 resides in measuring the histogram distribution from a video signal. The most frequent value F, i.e., the gradation existing more frequently in one image frame than any other gradation, is obtained from the distribution. In the backlight control unit, a plurality of regions have been set for gradations 0 to 255, each defined by eight bits. Those of the regions, which are pertinent to the value F, are examined. The backlight control unit outputs the control data set for the regions pertinent to the value F. The control data controls the amount of light the backlight emits.

In the conventional techniques, the regions for which the histogram distribution measured is applied are limited to those that comprise specific luminance levels. Further, the average picture level and the histogram distribution measured are used in combination, to control the backlight.

In the conventional image display devices, however, sufficient measures are not taken to reduce power consumption. If data representing the average picture level is used, the display screen may be frequently controlled brightness. In such a case, the image displayed will degrade in quality.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a display apparatus having a display, a signal-processing unit, a luminance-curve converter, a histogram-extracting unit, a characteristic-control-data output unit, an integrator, and a multiplier. The signal-processing unit processes a video signal. The converter converts the input/output characteristic of the luminance level of the video signal. The histogram-extracting unit generates histogram distribution data for a luminance level of a video signal. The characteristic-control-data output unit sets a characteristic to the luminance-curve converter so that the converter emphasizes a low-luminance region of the image represented by the input video signal. The integrator integrates data items pertaining to the region emphasized by the converter, thereby generating an integrated value. From the output of the integrator, the multiplier generates an output that lowers the light-adjusting voltage applied to the display device.

Embodiments of this invention will be described in detail, with reference to the accompanying drawings.

Figure 1:
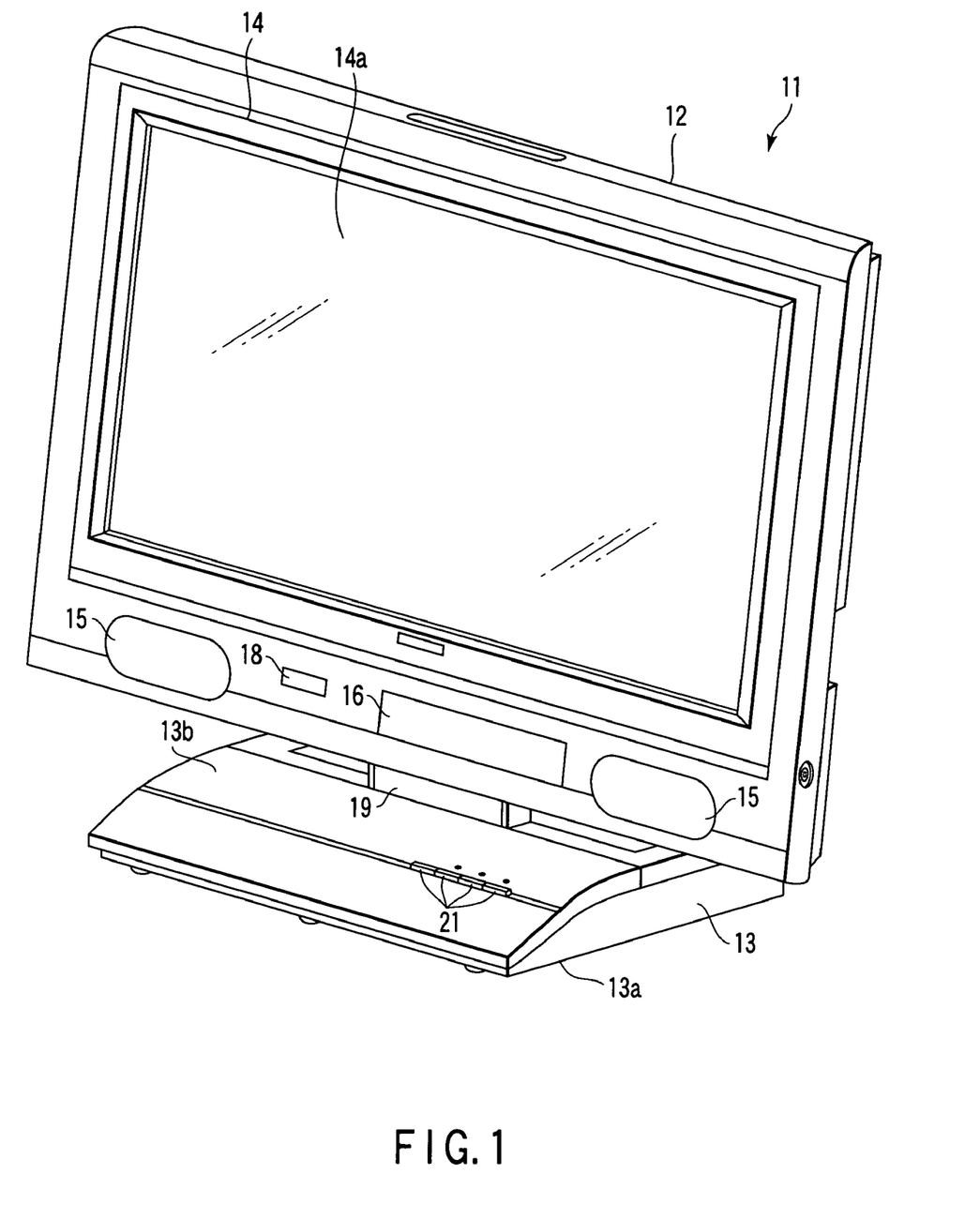
FIG. 1 is an exemplary perspective view showing the front of a television broadcast receiver according to an embodiment of this invention.

FIG. 1 is a perspective view showing the front of a television broadcast receiver 11 that is an embodiment of this invention. As FIG. 1 shows, the receiver 11 comprises a cabinet 12 and a stand 13. The cabinet 12 is the main unit of the receiver 11, which is thin and rectangular. The stand 13 supports and holds the cabinet 12 in standing position.

The display screen 14a of a display 14 is exposed at the front of the cabinet 12. The display 14 comprises, for example, a flat liquid crystal panel. A pair of speakers 15, an operation unit 16, and a light-receiving unit 18 are arranged on the front of the cabinet 12. The light-receiving unit 18 is configured to receive operation data from a remote controller 17 (not shown in FIG. 1).

The stand 13 is shaped like a thin box. It is configured to be mounted on a horizontal flat base (not shown), with its bottom plate 13a contacting the flat base. The stand 13 comprises a support member 19 that protrudes upward from the center part of the top plate 13b, which opposes the bottom plate 13a. The support member 19 is coupled to the back of the cabinet 12. The stand 13 therefore holds the cabinet 12 in the standing position.

The stand 13 incorporates an HDD 20 (not shown in FIG. 1). Buttons 21 (four buttons in this embodiment) are arranged on that part of the top plate 13b, which lies in front of the cabinet 12. The buttons 21 may be depressed to set the HDD 20 to various operating modes, such as recording mode, playback mode and stop mode.

Figure 2:
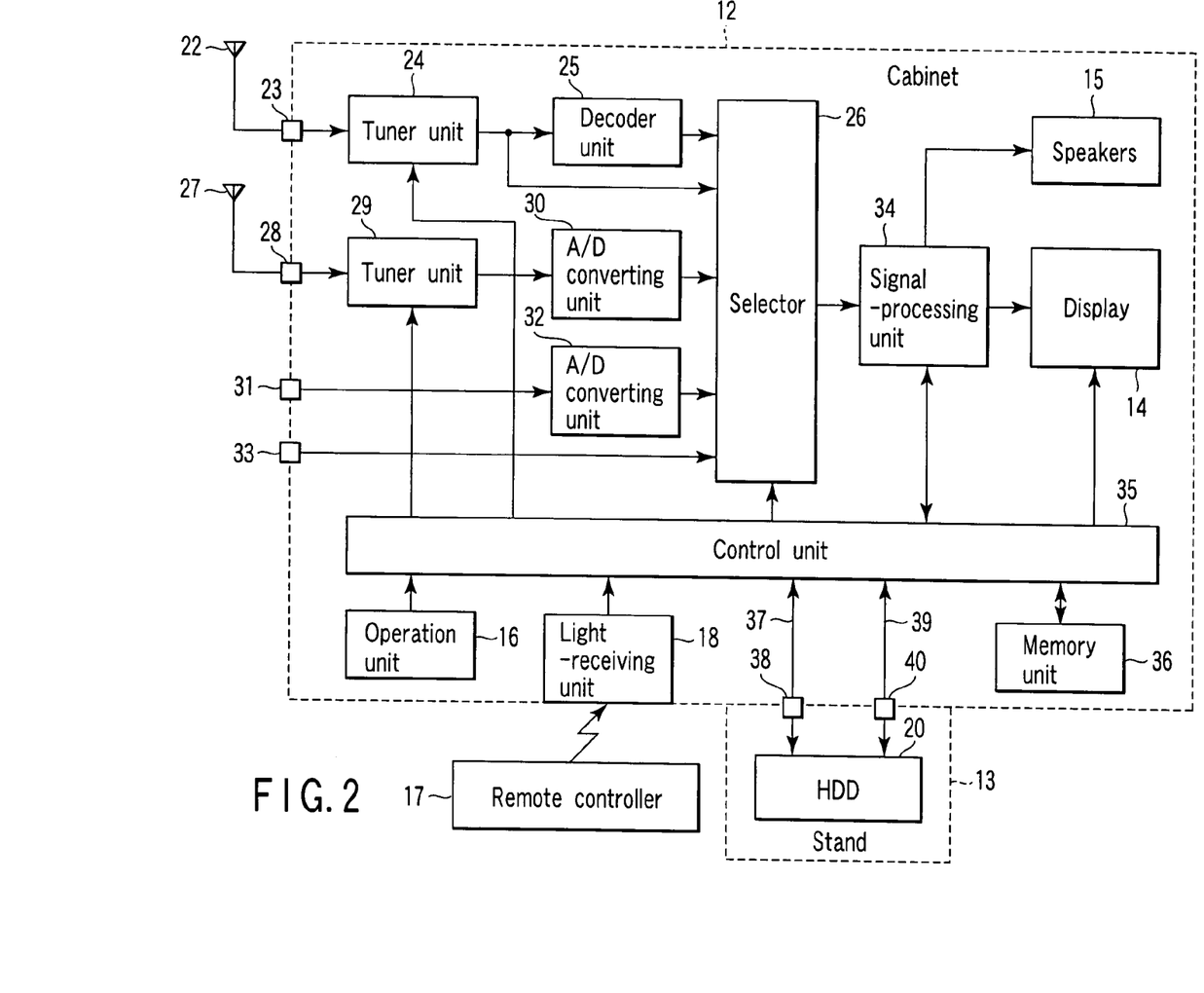
FIG. 2 is an exemplary block diagram of the signal-processing system incorporated in the television broadcast receiver according to an embodiment of this invention.

FIG. 2 schematically shows the signal-processing system incorporated in the television broadcast receiver 11. Most components of the signal-processing system are provided in the cabinet 12 and located near the back thereof. In other words, they are positioned at the back of the display screen 14a of the display 14.

An antenna 22 connected to the signal-processing system receives a digital television broadcast signal. The signal is supplied via an input terminal 23 to a tuner unit 24. The tuner unit 24 extracts a signal of a desired channel from the digital television broad signal input to it. The signal output from the tuner unit 24 is supplied to a decoder unit 25. The decoder unit 25 performs decoding, such as moving picture experts group 2 (MPEG2) decoding, on the signal input to it. The signal thus decoded is supplied to a selector 26.

The signal output from the tuner unit 24 is supplied directly to the selector 26. The selector 26 extracts video data and audio data from this signal. The video data and the audio data are supplied via a control unit 35 to the HDD 20. Thus, they can be recorded in the HDD 20.

Another antenna 27 is connected to the signal-processing system, too. This antenna 27 receives an analog television broadcast signal. This signal is supplied via an input terminal 28 to a tuner unit 29. This tuner unit 29 extracts a signal of the desired channel from the analog television broadcast signal and demodulates the same. The signal output from the tuner unit 29 is supplied to an analog/digital (A/D) converting unit 30. The A/D converting unit 30 converts the signal to a digital signal, which is output to the selector 26.

An analog video signal and an analog audio signal are supplied to an analog-signal input terminal 31 and thence to an A/D converting unit 32. The A/D converting unit 32 converts these signals to digital signals, which are supplied to the selector 26. Further, the analog video signal and the analogy audio signal are supplied to a digital-signal input terminal 33 and thence to the selector 26.

To record an A/D-converted signal in the HDD 20, the encoder incorporated in the selector 26 compresses the signal in a prescribed format such as MPEG2 format. Any A/D-converted signal, thus compressed, can be recorded in the HDD 20.

The selector 26 selects one of the five input digital video-audio signal, and supplies the selected video-audio signal to a signal-processing unit 34. The signal-processing unit 34 performs a specific process on the digital video signal contained in the video-audio signal. The digital video signal thus processed is supplied to the above-mentioned display 14. The image display 14 displays the image represented by the digital video signal. The display 14 is a flat panel display, such as a liquid crystal display. The signal-processing unit 34 performs a process on the digital audio signal contained in the video-audio signal, converting the signal to analog signals. The analog signals are supplied to the above-mentioned speakers 15, respectively. The speakers 15 generate sound from the analog signals, thus accomplishing audio playback.

In the television broadcast receiver 11, the control unit 35 controls various operations including the signal reception. The control unit 35 is a microprocessor that incorporates a central processing unit (CPU) and the like. The unit 35 receives the operation data from a remote controller 17 through the light-receiving unit 18. It controls some of the other components of the television broadcast receiver 11, in accordance with the operation data.

The control unit 35 uses a memory unit 36. The memory unit 36 comprises a read only memory (ROM), a random access memory (RAM), and a nonvolatile memory. The ROM stores the control programs the CPU executes. The RAM provides work areas for the CPU. The nonvolatile memory is provided to store various set data items, control data items and the like.

Note that the control unit 35 is connected to the HDD 20 that is provided in the stand 12. A line 37 is provided to supply power and control signals to the HDD 20. A connection unit 38 connects the line 37 to the control unit 35 and HDD 20.

A line 39 connects the control unit 35 and the HDD 20, for transferring digital video and audio signals between them. An i-Link (trade mark) connection unit 40 connects the line 39 to the control unit 35 and the HDD 20. Hence, digital video signals and digital audio signals are transferred between the control unit 35 and the HDD 20 by an i-Link, independently of the power and the control signals.

Any digital video signal and any audio signal that the selector 26 has selected in the television broadcast receiver 11 can, therefore, be recorded in the HDD 20. Moreover, the television broadcast receiver 11 can playback the digital video signal and the digital audio signal. Thus, the user can enjoy seeing the images represented by the video signal and listening to the sound represented by the audio signal.

Figure 3:
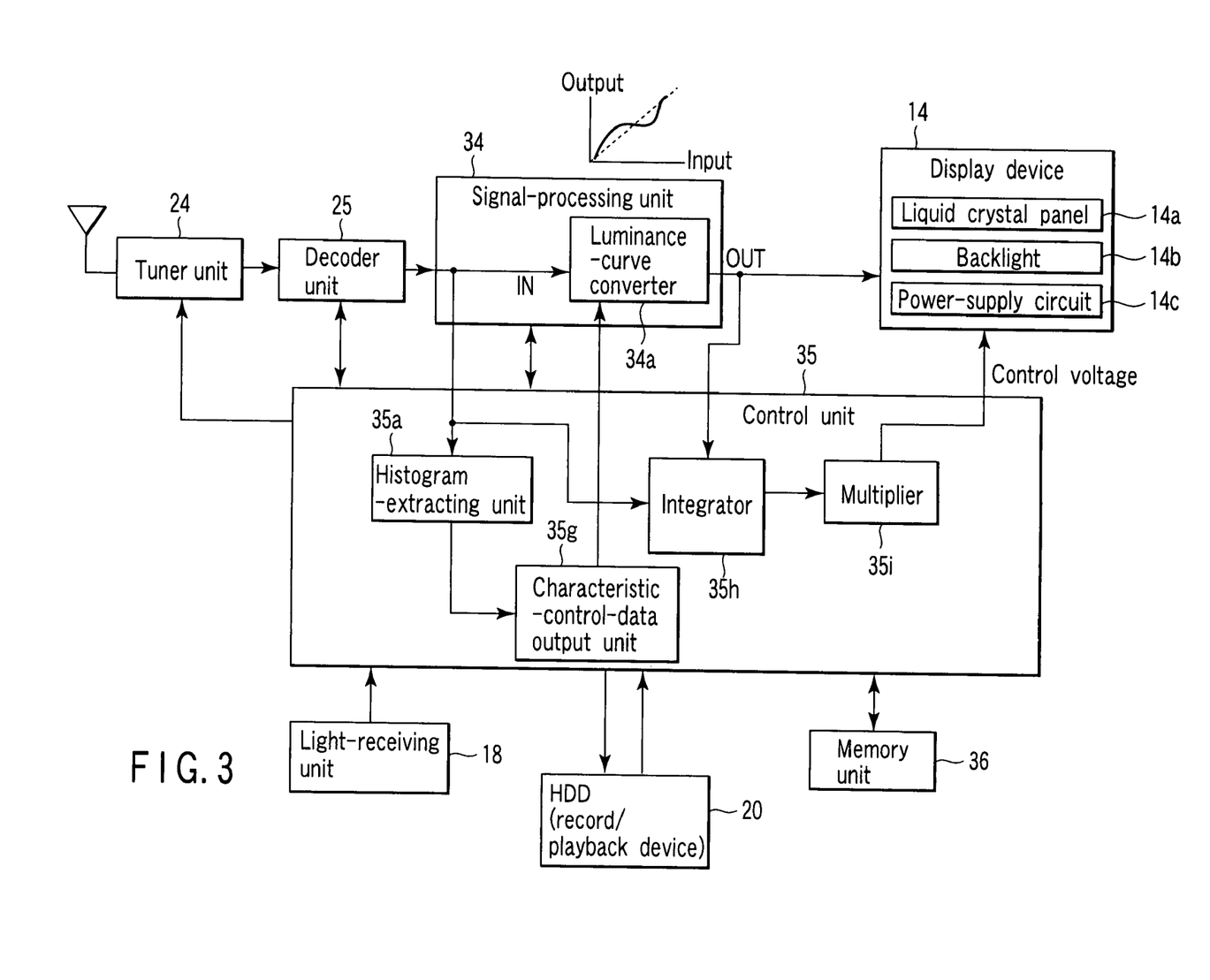
FIG. 3 is an exemplary block diagram depicting the major components of the receiver, which are characterizing features of an embodiment of this invention.

FIG. 3 shows the major components of the receive 11, which are characterizing features of this invention. The signal-processing unit 34 incorporates a histogram-extracting unit 35a, a control-data output unit 35g, an integrator 35h, and a multiplier 35i.

The signal-processing unit 34 further incorporates a luminance-curve converter 34a. The luminance-converting characteristic of the converter 34a is controlled by control data supplied from the control-data output unit 35g. The control-data output unit 35g generates characteristic control data from the histogram distribution data supplied from the histogram-extracting unit 35a. The characteristic control data sets an input/output characteristic for the luminance level of an input video signal. The input/output characteristic will be described later.

The histogram-extracting unit 35a generates a histogram distribution of the luminance level of the video signal output from the signal-processing unit 34 (i.e., the luminance level of the video signal input to the luminance-curve converter 34a). At this time, the memory unit 36 stores one frame (or one field) of the video signal. Using the frame (or field) stored in the memory unit 36, the histogram-extracting unit 35a extracts histogram distribution data. The histogram distribution data thus extracted is input to the characteristic-control-data output unit 35g. The unit 35g generates characteristic control data, which is supplied to the characteristic control unit provided in the luminance-curve converter 34a. The luminance-curve characteristic may be set in units of one frame (one field) or in units of several frames (or several fields).

The integrator 35h receives two luminance signals that are at the input and output of the luminance-curve converter 34a, respectively. The integrator 35h integrates the emphasized data in the low-luminance region (dark region) data output from the luminance-curve converter 34a. If the data input to the converter 34a is at a higher level tan the data output from the converter 34a, the integrator 35h accumulates the difference between the data input to the converter 34a and the data output from the converter 34a. The data accumulated is input to the multiplier 35i. The multiplier 35i multiplies the data by a coefficient for each frame (or each field), generating a control voltage (light-adjusting voltage). This control voltage controls the power-supply circuit 14c provided in the display 14.

The display 14 includes a backlight 14b at the back op the liquid crystal display panel 14a. The power-supply circuit 14 drives the backlight 14b. A control voltage (i.e., light-adjusting voltage) is applied to the power-supply circuit 14c from the control unit 35. The control voltage can adjust the luminance of the backlight 14b.

Figure 4A:
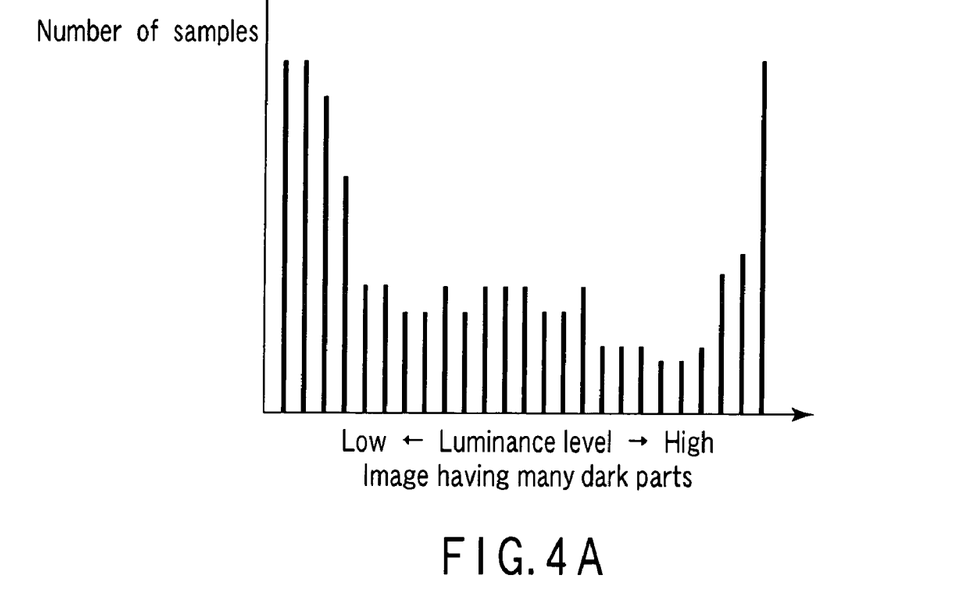
FIG. 4A is an exemplary diagram showing the histogram distribution of an image according to an embodiment of this invention.
Figure 4B:
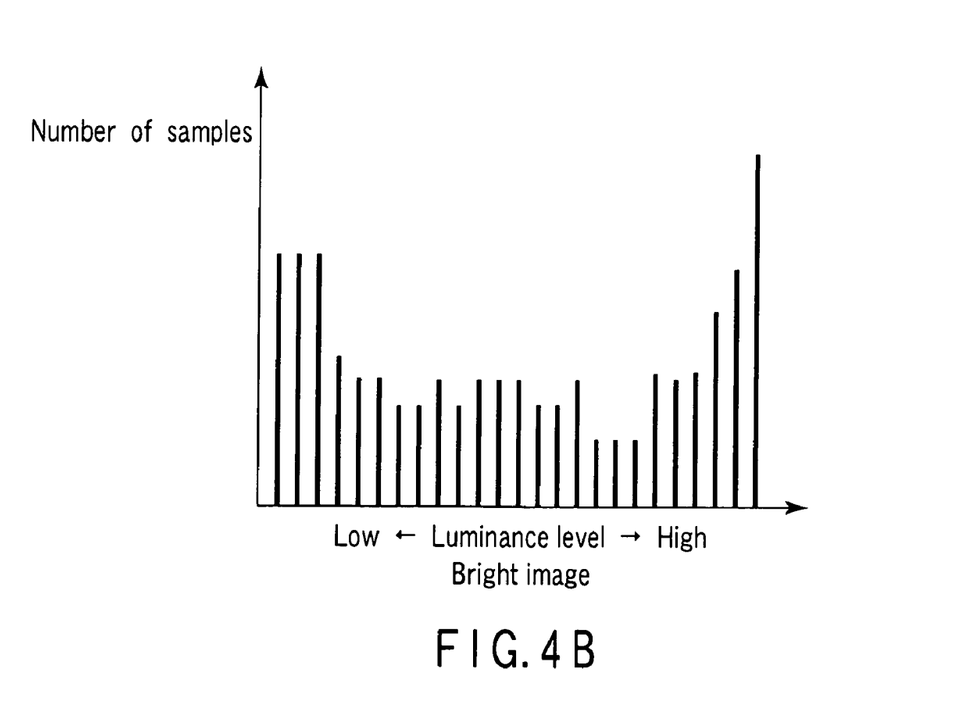
FIG. 4B is an exemplary diagram showing the histogram distribution of another image according to an embodiment of this invention.

FIGS. 4A and 4B show the histogram distributions of two images, respectively. FIG. 4A indicates the characteristic of a video signal representing one frame (or one field) of an image that is dark as a whole but comprises some bright parts. FIG. 4B indicates the characteristic of a video signal representing one frame (or one field) of an image that is bright as a whole and comprises very bright parts.

From the histogram distribution data described above, it can be determined whether the image represented by the video signal is dark or bright as a whole. In the television broadcast receiver 11, the input/output characteristic of any video signal input is controlled.

Figure 5:
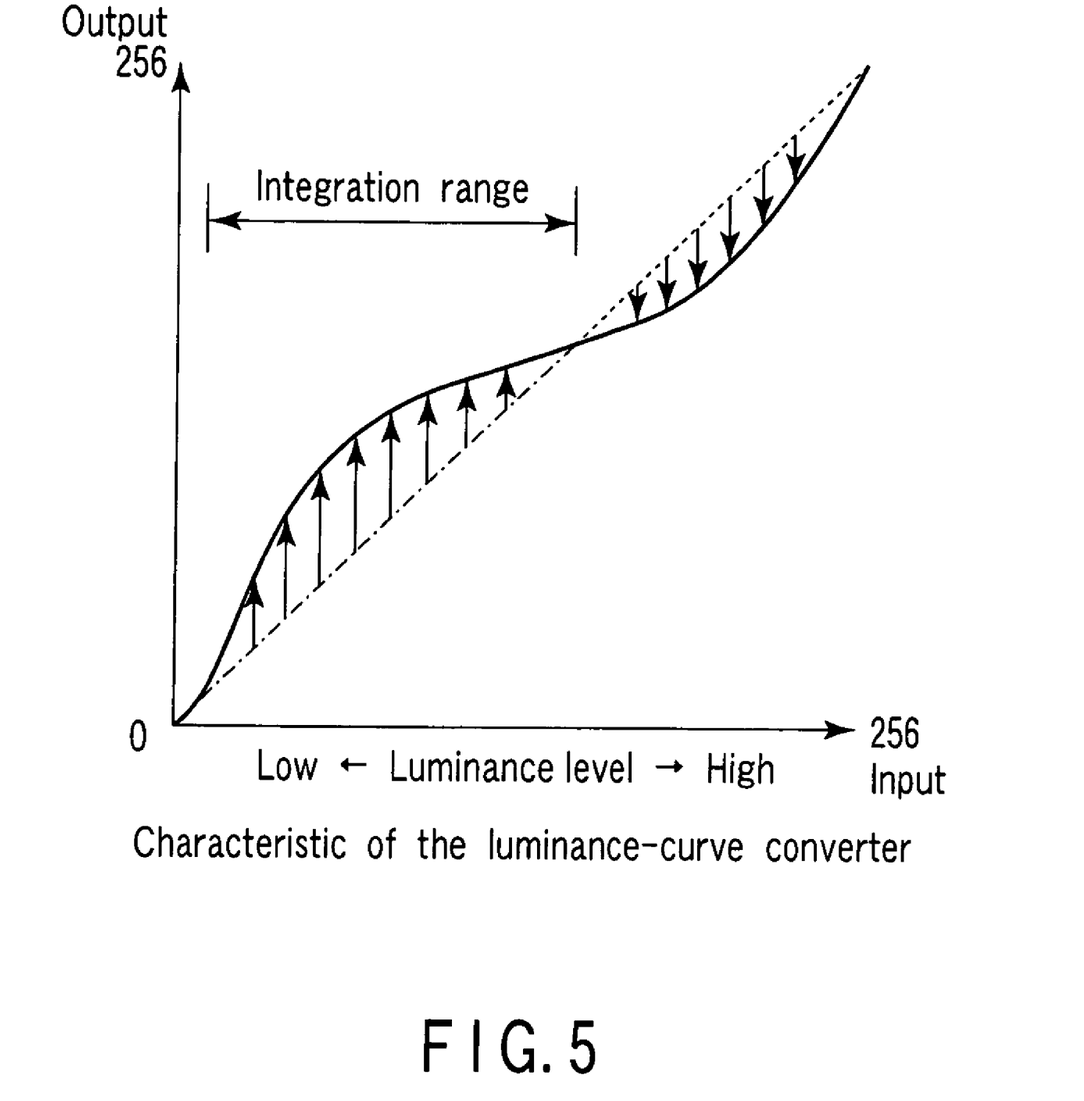
FIG. 5 is an exemplary diagram explaining the conversion characteristic of the luminance-curve converter shown in FIG. 3.

FIG. 5 is a diagram explaining the input/output characteristic of the luminance-curve converter 34a. As seen from FIG. 5, the output signal of the converter 34a is emphasized if the input signal comprises a low luminance level. (That is, the output signal is emphasized if the image represented by the input signal is dark.) If the input signal comprises a high luminance level, the output signal of the converter 34a is suppressed. (That is, the output signal is suppressed if the image represented by the input signal is bright.) In the conventional TV broadcast receiver, the input/output characteristic changes linearly as indicated by the dashed line in FIG. 5. In the television broadcast receiver 11, the input/output characteristic changes nonlinearly as indicated by the solid line in FIG. 5, emphasizing the output signal in the low-luminance region and to suppressing the output signal in the high-luminance region.

As a result, a dark image looks bright on the display 14 because the signal representing it is emphasized in terms of luminance level. This enhances the gradation of any dark region of the image. Thus, for example, black hair on a dark background, which cannot be seen unless signal is emphasized, can be recognized. However, the dark region of the image may be too conspicuous (or outstanding from the other regions). In this case, the backlight 14b is controlled, emitting less light, whereby the image looks rather dark as a whole, rendering the dark region less conspicuous. This helps to reduce the power consumption.

The input data and output data of the luminance-curve converter 34a are supplied to the integrator 35h. The integrator 35h integrates the data about the emphasized region in a dark image (FIG. 5). More precisely, the integrator 35h subtracts the input data of the converter 34a from the output data thereof and then accumulates the resulting difference, thereby obtaining the integrated value. The output of the integrator 35h (i.e., integrated value) is input to the multiplier 35i. The multiplier 35i multiplies the integrated value data by a coefficient, adjusting the gain. The gain thus adjusted is output as control voltage to the power-supply circuit 14c of the display 14.

The dark region of the image may therefore become conspicuous (or outstanding from the other regions). Thus, the backlight 14b is controlled, and the amount of light (i.e., potential level of the amount of light) of the display device 14 is reduced, whereby the image looks rather dark as a whole and the dark region is rendered less conspicuous. The power consumption is thereby reduced.

Figure 6:
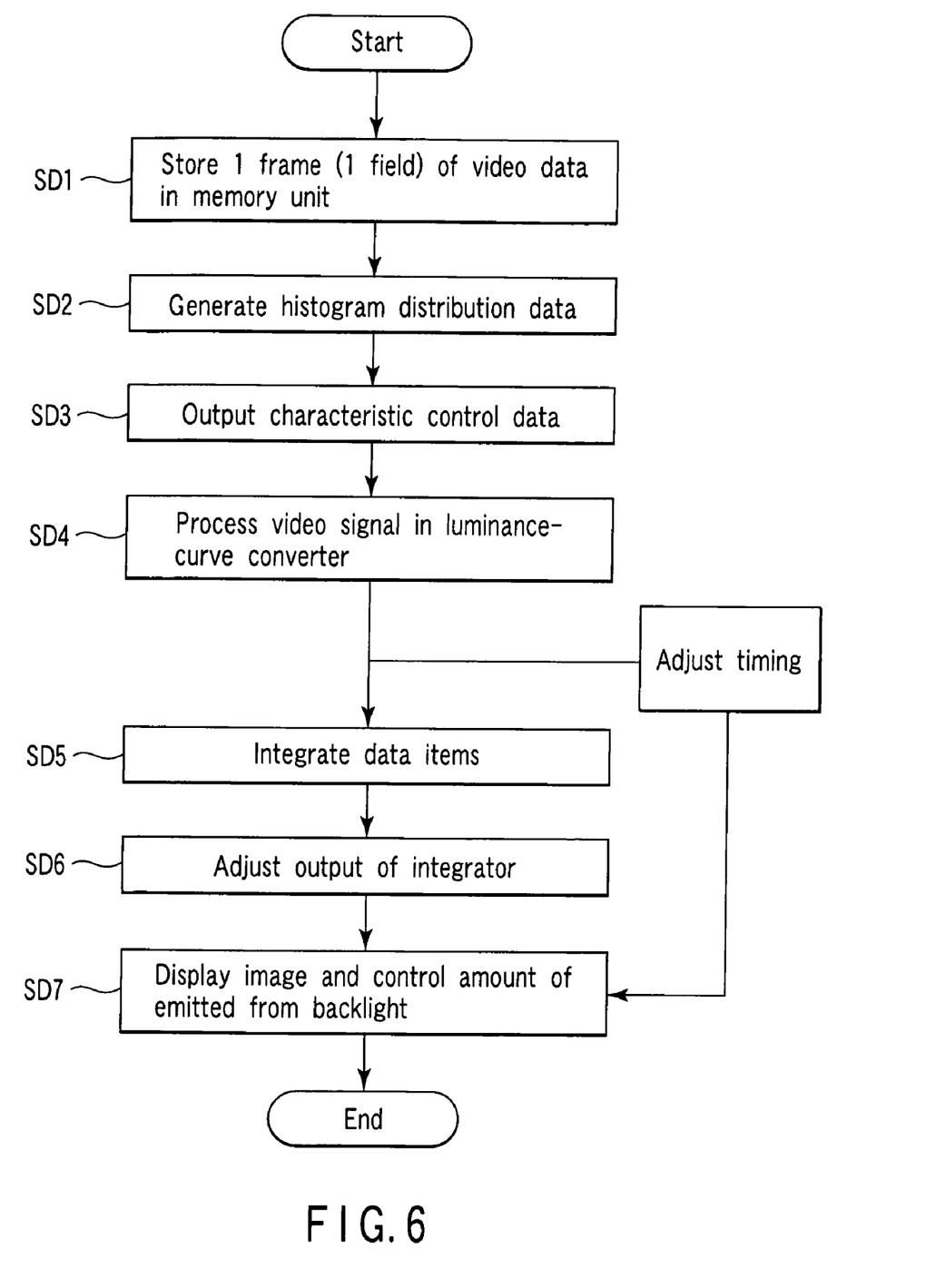
FIG. 6 is an exemplary flowchart showing how the television broadcast receiver shown in FIG. 1 operates.

FIG. 6 is a flowchart showing how the television broadcast receiver 11 operates. The memory unit 36 stores one frame (or one field) of the video signal output from the signal-processing unit 34 (Block SD1). Histogram distribution data is generated (Block SD2). The characteristic-control-data output unit 35g generates characteristic control data from the histogram distribution data thus generated (Block SD3). Using the characteristic control data, the luminance-curve converter 34a processes the input video signal (SD4).

The integrator 35h integrates the data items about those of the dark regions, which have been emphasized in luminance (Block SD5). The multiplier 35i adjusts the output of the integrator 35h (Block SD6). At this time the video signal that has been time-adjusted is supplied to the liquid crystal panel of the display 14, which displays the image represented by this video signal (BlockSD7).

Figure 7:
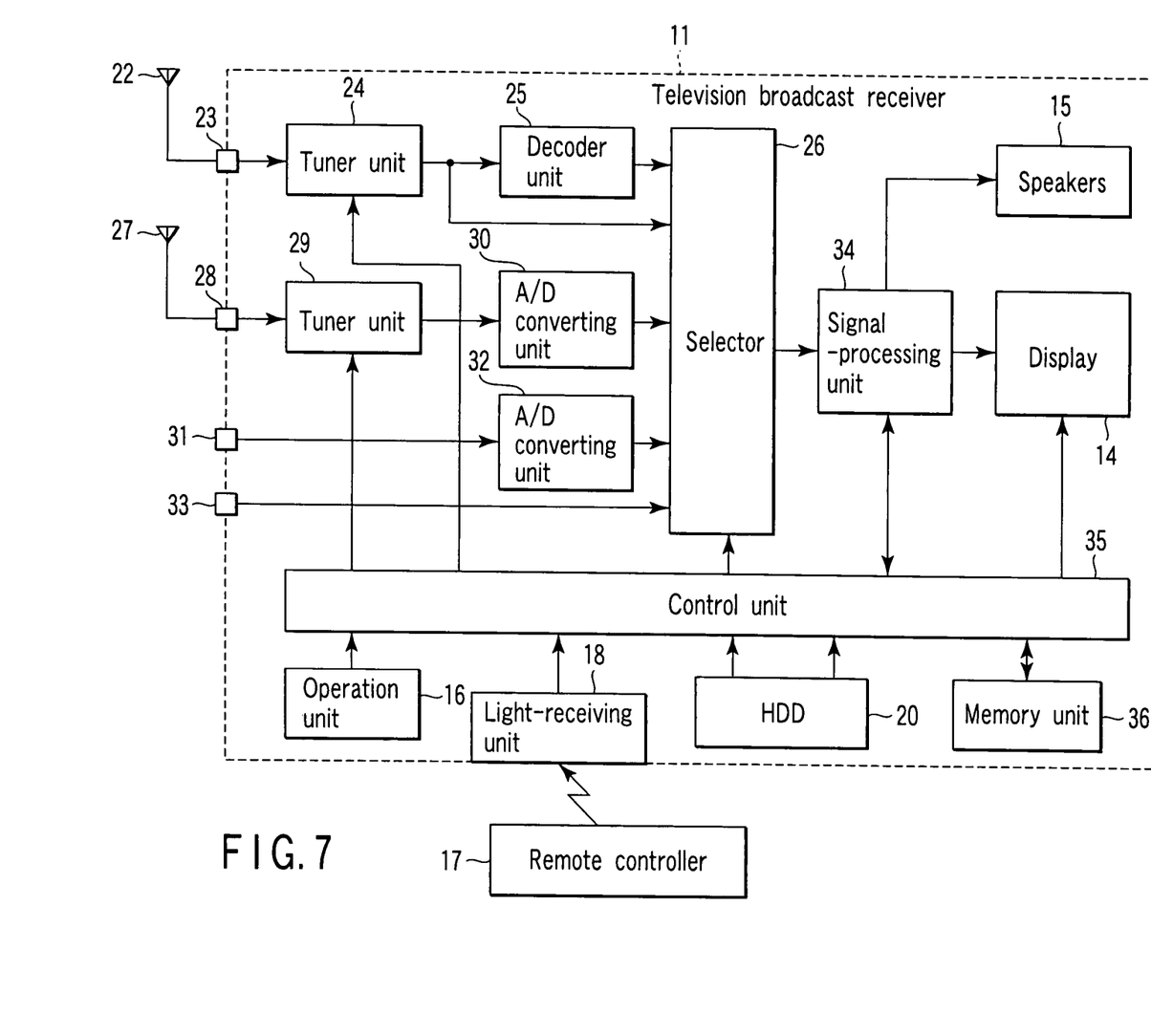
FIG. 7 is an exemplary block diagram depicting another television broadcast receiver according to an embodiment of this invention.

This invention is not limited to the embodiment described above. As seen from FIG. 2, the signal-processing system of the television broadcast receiver 11 is regarded as comprising two separate sections, i.e., cabinet 12 and stand 13. Nevertheless, the cabinet 12 and the stand 13 can be equivalently considered as a single unit in which the receiver 11 incorporates the HDD 20 as is illustrated in FIG. 7.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display apparatus comprising:
a receiving unit which receives a video signal;
a signal-processing unit which performs a specific process on the video signal received at the receiving unit;
a luminance-curve converter which converts the input/output characteristic of the luminance level of an input video signal in the signal-processing unit;
a display device which displays an image represented by the video signal that is an output of the luminance-curve converter;
a histogram-extracting unit which generates histogram distribution data for a luminance level of a video signal that is to be input to the luminance-curve converter;
characteristic-control-data output unit which sets a characteristic to the luminance-curve converter so that the luminance-curve converter emphasizes a low-luminance region when the histogram distribution data shows that the image represented by the input video signal comprises the low-luminance region;
an integrator which integrates data items pertaining to the region emphasized by the luminance-curve converter, thereby generating an integrated value; and
a multiplier which generates, from the integral value, an output that reduces a potential level of the amount of light of the display device.

2. The display apparatus according to claim 1, wherein the low-luminance region comprises a luminance level that is lower than an intermediate value between a maximum value and minimum value for the luminance level.

3. The display apparatus according to claim 1, wherein the luminance-curve converter is set to such a characteristic that an input is suppressed for a high-luminance region of the image represented by the input video signal.

4. The display apparatus according to claim 1, wherein the multiplier generate finds a difference between two luminance signals input to and output from the luminance-curve converter, respectively, and accumulates the difference when the luminance signal output from the luminance-curve converter is greater than the luminance signal input to the luminance-curve converter.

5. The display apparatus according to claim 1, wherein the output of the multiplier controls a power-supply voltage of a backlight provided in the display.

6. A method of controlling a backlight for use in a display apparatus comprising a receiving unit which receives a video signal, a signal-processing unit which performs a specific process on the video signal received at the receiving unit, a luminance-curve converter which converts the input/output characteristic of the luminance level of an input video signal in the signal-processing unit, a display device which displays an image represented by the video signal that is an output of the luminance-curve converter, and a control unit which controls the other components of the display apparatus, said method comprising:
generating histogram distribution data for a luminance level of a video signal that is to be input to the luminance-curve converter;
setting a characteristic to the luminance-curve converter so that the luminance-curve converter emphasizes a low-luminance region when the histogram distribution data shows that the image represented by the input video signal comprises the low-luminance region;
generating a control signal that reduces the amount of backlight to a value corresponding to the value obtained by integrating the controlling part of the low-region data output from the luminance-curve converter;
setting a characteristic to the luminance-curve converter so that the luminance-curve converter emphasizes a low-luminance region when the histogram distribution data shows that the image represented by the input video signal comprises the low-luminance region;
integrating data items pertaining to the region emphasized by the luminance-curve converter, thereby generating an integrated value; and;
reduces a luminance of the display device, by using the integrated value.

7. The method according to claim 6, wherein the low-luminance region comprises a luminance level that is lower than an intermediate value between a maximum value and minimum value for the luminance level.

8. The method according to claim 6, wherein the luminance-curve converter is set to such a characteristic that an input is suppressed for a high-luminance region of the image represented by the input video signal.

9. The method according to claim 6, wherein the integrated value is generated by finding a difference between two luminance signals input to and output from the luminance-curve converter, respectively, and by accumulating the difference when the luminance signal output from the luminance-curve converter is greater than the luminance signal input to the luminance-curve converter.

10. The method according to claim 6, wherein a power-supply voltage of a backlight provided in the display is controlled to reduce a light-adjusting voltage applied to the display.

* * * * *